UNITED STATES PATENT OFFICE.

JAKOB SCHMID AND JACQUES BACHELUT, OF BASLE, SWITZERLAND, ASSIGNORS TO THE SOCIETY OF CHEMICAL INDUSTRY IN BASLE, OF SAME PLACE.

BLUE DYE.

SPECIFICATION forming part of Letters Patent No. 519,971, dated May 15, 1894.

Application filed December 15, 1893. Serial No. 493,774. (Specimens.)

*To all whom it may concern:*

Be it known that we, JAKOB SCHMID, a citizen of Switzerland, and JACQUES BACHELUT, a citizen of France, both residing at Basle, Switzerland, have invented new and useful Improvements in the Production of a Blue Coloring-Matter or Dye-Stuff, of which the following is a specification.

Our invention relates to the production of a blue acid coloring-matter by heating mixtures of equal molecular proportions of dialkylized anilin, monoalkylized orthotoluidin and metaoxybenzaldehyde in presence of condensing agents, subsequently sulfonating and finally oxidizing the thus obtained leuco compound.

The coloring-matter which has the general formula:

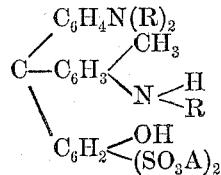

where R represents the alkyl group (methyl or ethyl) and A the equivalent quantity of any alkali distinguishes itself from the analogous products hitherto known by its bright blue shade on wool and silk and by the useful property that it does not change its hue in artificial light.

In carrying out our process we proceed as follows:

(*a.*) Condensation: 12.2 kilos of meta oxybenzaldehyde, twelve kilos of dimethylanilin, twelve kilos of monomethylorthotoluidin, fifty kilos of muriatic acid, sixteen kilos of sulfuric acid of 66° B. (Baumé) are heated in an enameled vessel on the water bath during twenty-four hours. The resulting condensation product is neutralized very carefully with an alkali and the unaffected oils are expelled by steam. The leuco-base which remains in the vessel is washed two or three times with warm water, and then it is dried at 100° Celsius. It solidifies in the cold and forms a gray to pale-green mass, easily soluble in acids as well as in caustic alkalies. For dimethylanilin the equivalent quantity of diethylanilin and for mono-methyl orthotoluidin the corresponding quantity of mono ethylorthotoluidin may be substituted in the above example and instead of meta oxybenzaldehyde the alkylized ethers of meta oxybenzaldehyde may be employed.

(*b.*) Sulfonation: Ten kilos of the leuco-base obtained according to example *a.*, are dissolved at 60° Celsius in forty kilos of sulfuric acid of 66° Baumé. To the mixture ten kilos of fuming sulfuric acid (containing twenty-four per cent. of anhydrid) are added and the reaction is terminated as soon as a test sample dissolves completely in acetate of soda. Then the sulfonation product thus obtained is poured into two hundred liters of water, neutralized with lime and the solution of the calcareous salt of leuco sulfo acid is filtered.

(*c.*) Oxidation: The oxidation of the sulfonated liquid may be easily effected with the theoretical quantity of a peroxid (peroxid of lead or of manganese) or with chromic acid. The solution obtained according to example *b.*, is diluted with six kilos of sulfuric acid and oxidized by addition of 2.8 kilos of bichromate of soda. The lime and the chrome oxide are precipitated with ammonia, filtered and the solution of the coloring-matter is evaporated.

The dye-stuff results in the form of a dark powder having a metallic luster easily soluble in water with a magnificent blue coloration. By addition of mineral acids the solution turns yellow-green, by caustic soda lye bluish-green. In concentrated sulfuric acid it dissolves with a yellow coloration which changes into green on addition of a large quantity of water. It is easily soluble in alcohol but insoluble in ether and benzene. It dyes blue on wool and silk in the acidulated bath.

Instead of sulfonating first the leuco-base resulting according to example *a.*, and to oxidize afterward, the operation can be carried out inversely, that is to say, the leuco-base is oxidized first and the coloring-matter subsequently sulfonated.

What we claim as new, and desire to secure by Letters Patent, is—

1. The process for the production of a new blue acid coloring-matter which process consists in heating mixtures of equal molecular proportions of dialkylized anilin, alkylized ortho-toluidin and meta oxybenzaldehyde in presence of condensing agents, subsequently sulfonating and finally oxidizing the thus obtained new leuco-sulfo acid in the manner as hereinbefore described.

2. As a new article of manufacture the coloring-matter having the general formula:

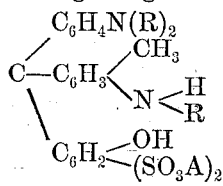

forming a dark powder with metallic luster, easily soluble in water with a magnificent blue coloration, which turns yellow-green on the addition of mineral acids, and bluish-green when caustic soda-lye is added, and in concentrated sulfuric acid it dissolves with a yellow coloration which changes into green on the addition of an excess of water; it is soluble in alcohol but insoluble in ether and benzene.

In testimony whereof we have hereunto set our hands in the presence of two subscribing witnesses.

JAKOB SCHMID.
JACQUES BACHELUT.

Witnesses:
F. WALTER,
GEORGE GIFFORD.